United States Patent [19]
Watkins, Jr.

[11] 4,272,089
[45] * Jun. 9, 1981

[54] TRACTOR-TRAILER LAND VEHICLE

[76] Inventor: Robert G. Watkins, Jr., No. 2 Longview Rd., R.D. #4, Coatesville, Pa. 19320

[*] Notice: The portion of the term of this patent subsequent to Apr. 17, 1996, has been disclaimed.

[21] Appl. No.: 26,056

[22] Filed: Apr. 2, 1979

Related U.S. Application Data

[63] Continuation of Ser. No. 769,518, Feb. 17, 1977, Pat. No. 4,149,732.

[51] Int. Cl.³ .............................................. B60P 3/22
[52] U.S. Cl. .................................................. 280/5 C
[58] Field of Search ............... 280/437, 474, 460 R, 280/423 R, 432, 400, 402, 404, 415 R, 415 B, 91, 5 R, 5 A, 5 C, 5 D, 5 E; 180/24.01, 22, 53 R, 11, 12, 13, 14 R, 77 MC; 222/626, 627, 609, 610; 141/284

[56] References Cited

U.S. PATENT DOCUMENTS

| | | | |
|---|---|---|---|
| 991,051 | 5/1911 | Dion | 180/24.01 |
| 1,853,817 | 4/1932 | Jordan | 280/460 R |
| 2,603,365 | 7/1952 | Moores | 280/460 R |
| 2,777,606 | 1/1957 | Moore | 222/627 X |
| 3,183,991 | 5/1965 | Gamaunt | 280/91 |
| 3,542,414 | 11/1970 | Nelson | 280/423 R |
| 3,883,160 | 5/1975 | Meyers | 280/432 |
| 3,986,727 | 10/1976 | Cox | 280/423 R |
| 4,149,732 | 4/1979 | Watkins | 280/5 C |

Primary Examiner—John J. Love
Assistant Examiner—Randall A. Schrecengost
Attorney, Agent, or Firm—Frailey & Ratner

[57] ABSTRACT

A fuel transport land vehicle formed by a tractor and a trailer carrying fuel in which the tractor has a plurality of axles all of which are steerable. The tractor and trailer are detachably coupled so that they remain along the same general longitudinal axis and sideways relative motion between the tractor and trailer is prevented. A pumping module is removably coupled to the vehicle and has disposed therein means for pumping, filtering and modulating the flow of fuel from the trailer.

7 Claims, 13 Drawing Figures

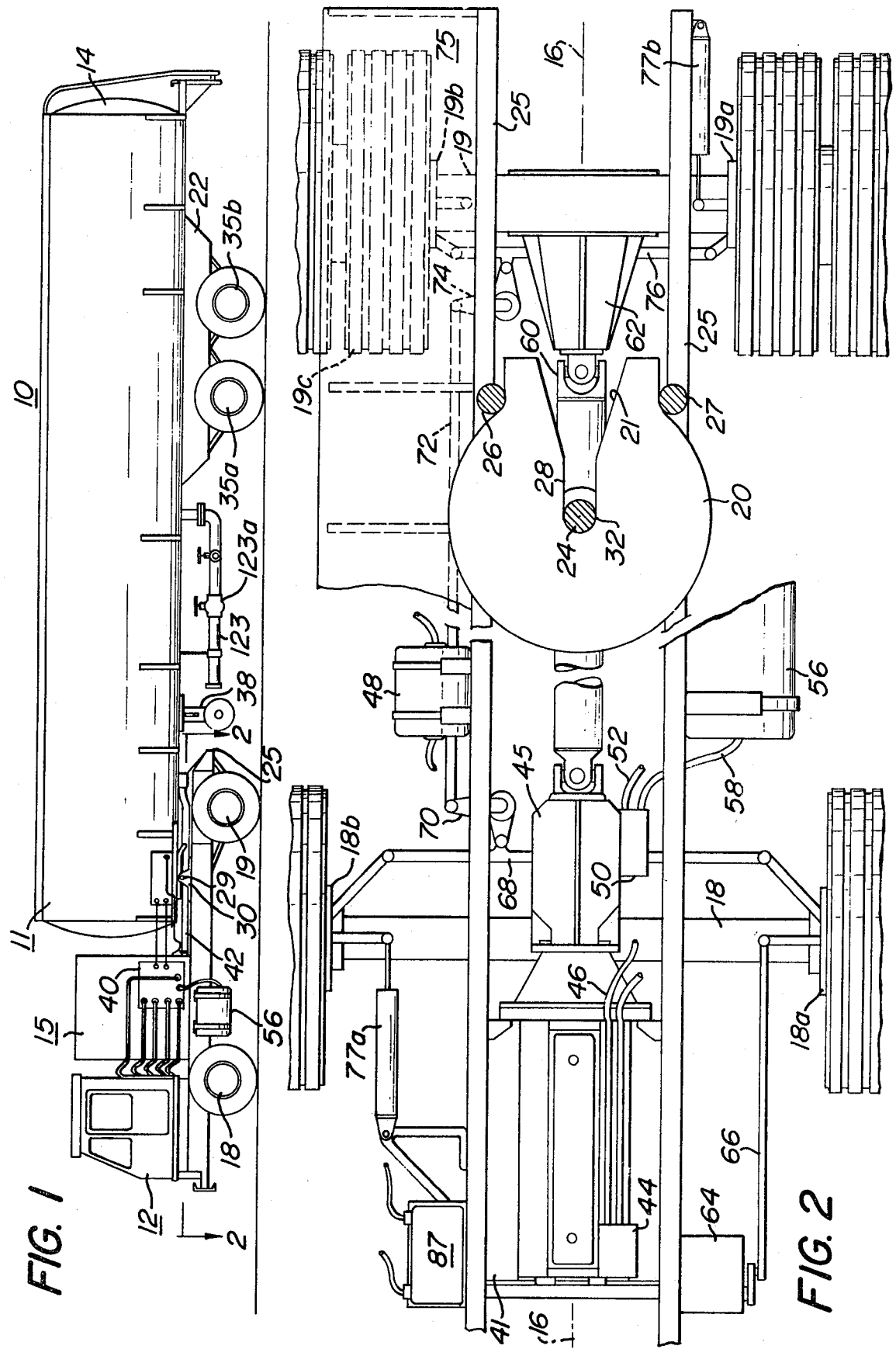

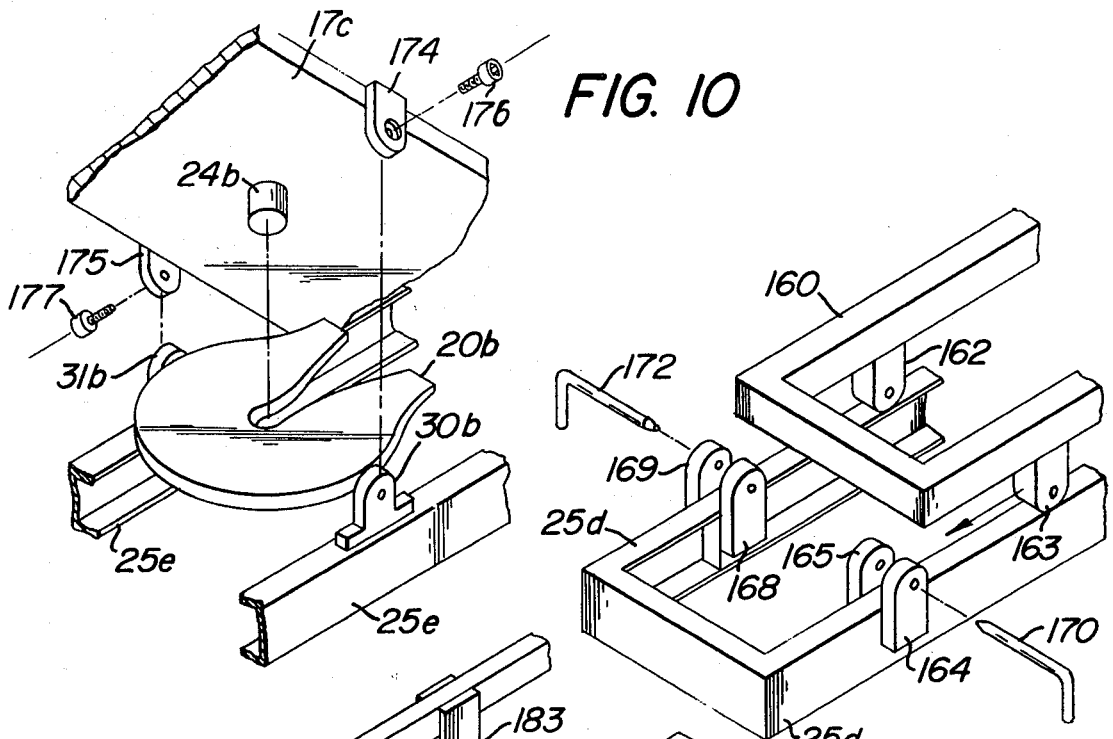
FIG. 10
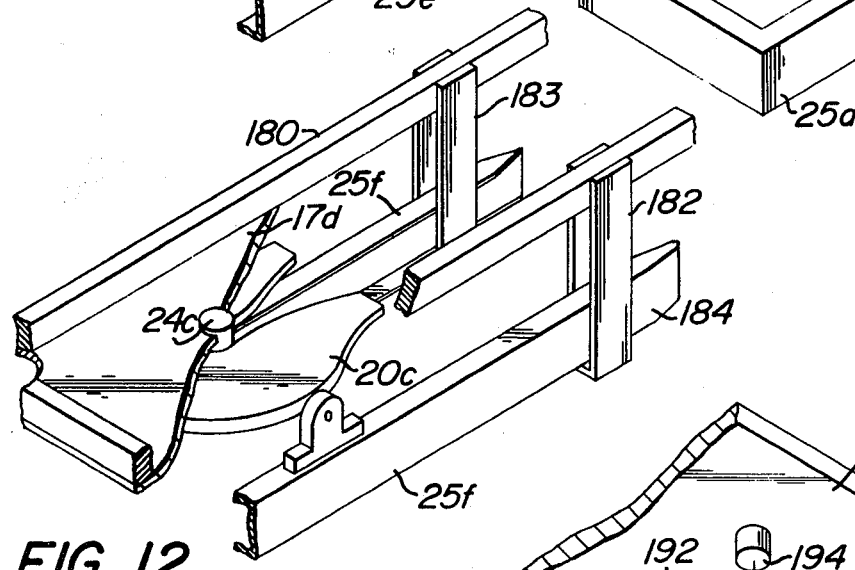
FIG. 11
FIG. 12
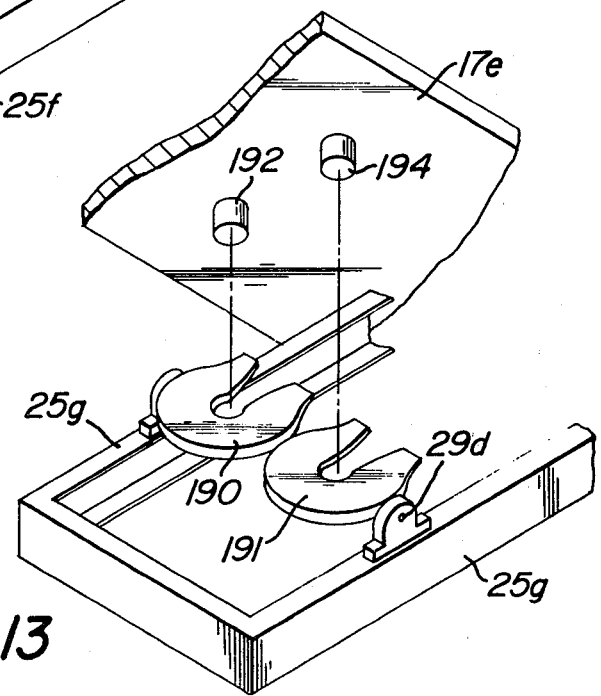
FIG. 13

TRACTOR-TRAILER LAND VEHICLE

This is a continuation of application Ser. No. 769,518, filed Feb. 17, 1977, now U.S. Pat. No. 4,149,732.

BACKGROUND OF THE INVENTION

A. Field of the Invention

This invention relates to the field of art of tractor-trailers.

B. Prior Art

Straight trucks are those which have an integral chassis in which there is no relative movement between the cab and the load carrying section. These trucks are used extensively for such uses as over the highway transporting, in city service as well as for special purposes. One special purpose straight truck is a fuel transport vehicle for jet refueling at an airport. Such refuelers have tanks which carry fuel to an aircraft where internal pumps are used to pump the fuel from the tank into the aircraft. Many of these trucks have required two front steerable axles because of the weight distribution over the front axles.

However, these prior refuelers have left much to be desired since they have been specially designed and custom made and thus have been very costly. In addition, the highly complex pumps and controls have been spread out and attached at different positions over the entire vehicle. When any one of these parts has become inoperable, then the entire vehicle has not been usable causing expensive down time of a costly piece of equipment. If the truck engine itself has needed repairs then the entire vehicle has also been unusable. Further, any repairs to the truck engine, pumps and controls have been made much more difficult where airport authorities have not permitted inside shops to be built. Since the only other cover would be a hanger, where fuel tanks are never permitted, all repairs have thus been made out in the open even under adverse weather conditions.

While fuel transport tractor-trailers have been known and mass produced, they have not been used at most airports because of the requirement of maneuvering into very confined spaces around the jet aircraft. Specifically, the area around the jet aircraft becomes congested with baggage trucks, generators, catering trucks, etc. Under these adverse conditions, only a very highly skilled driver may be able to so intricately maneuver a tractor-trailer without hitting the aircraft itself or other vehicles or objects. A collision might cause a fuel spill which is a completely unacceptable risk since the dumped jet fuel if it were ignited would cause a catastrophic loss of life and property. Maneuvering a tractor-trailer requires the highest skill when backing up close to a very costly aircraft where a mistake (even without dumping fuel) would cause serious damage. Since most airlines and airport authorities have had difficulty in obtaining an assured supply of such highly skilled drivers, tractor-trailers have been in the main proscribed as refuelers.

SUMMARY OF THE INVENTION

A land vehicle comprising a tractor and a trailer. The tractor and trailer are detachably coupled so that they are along the same longitudinal axis and prevented from having relative motion in a horizontal plane passing through that general longitudinal axis.

Further in accordance with the invention, the trailer has a tank for carrying fuel and a pumping module is provided with a housing removably coupled to the vehicle. The pumping module includes pumping means, filtering means and means for modulating the flow of the fuel all disposed within the housing.

BRIEF DESCRIPTION OF THE DRAWINGS

FIG. 1 is a side view of a fuel transport land vehicle embodying the invention;

FIG. 2 is an elevation sectional view of the tractor section of the land vehicle of FIG. 1 taken along lines 2—2;

FIGS. 7–13 are perspective sectional views of further embodiments of detachable couplings for the vehicle of FIG. 1.

DETAILED DESCRIPTION

Figures 3, 4:
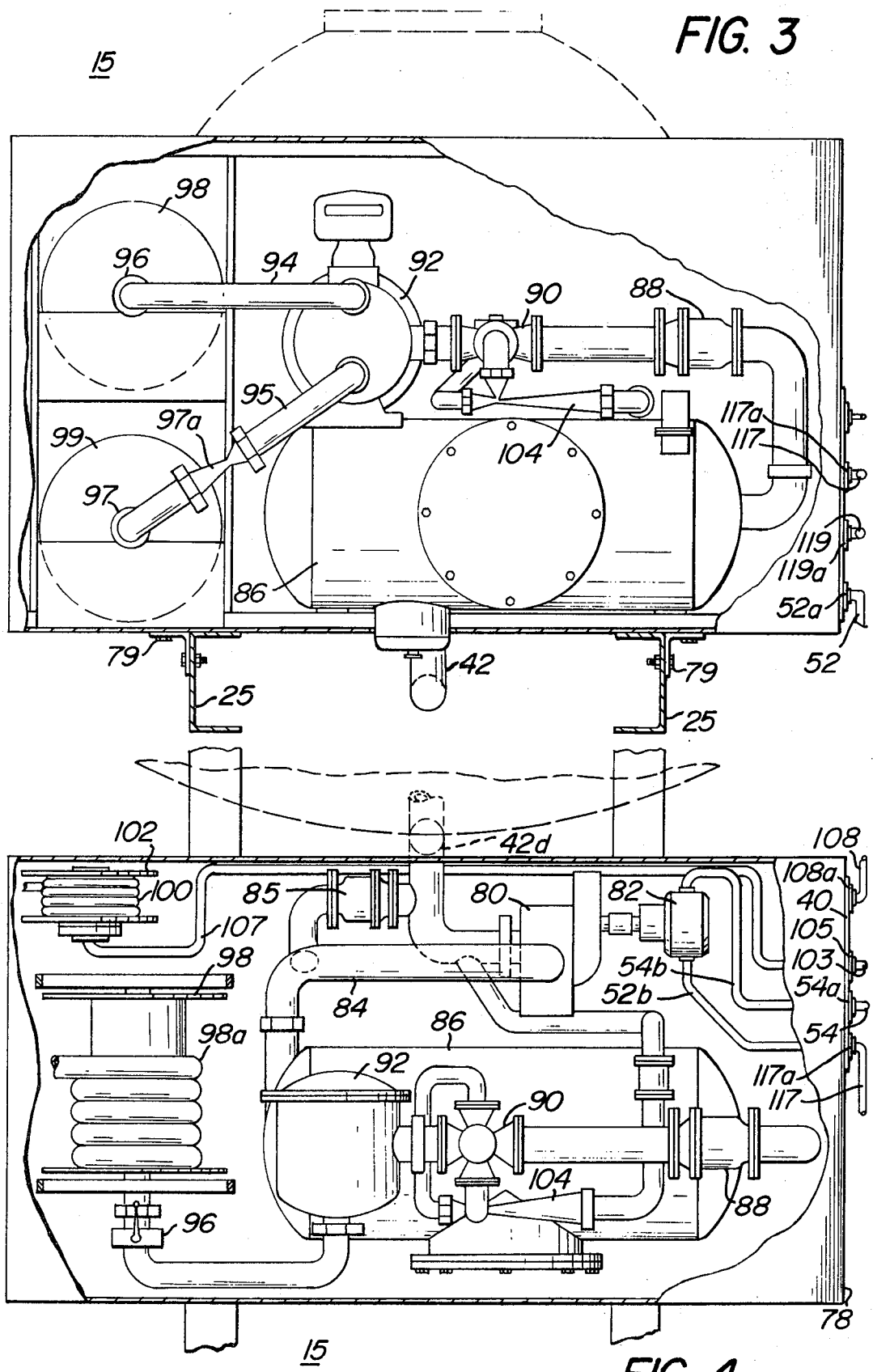
FIG. 3 is a side elevation view of the pumping module of FIG. 1 looking toward the back of the vehicle.
FIG. 4 is a top plane view of the pumping module of FIG. 1 with a portion of the top wall cut away.

Referring now to FIG. 1, there is shown a modular airport refueler vehicle 10 for jet aircraft which comprises three basic components, viz, a power module 12, a tank module 11 and a pumping module 15. Power module 12 is made up of a conventional tractor which has been modified so that it has steerable first and second (front and rear) axles 18 and 19. Power module 12 has a rearwardly extending chassis 25 which supports the removably coupled pumping module 15 and a detachable coupling or fifth wheel 20. Fifth wheel 20 engages a king pin 24 of tank module 11 which is formed of a conventional highway tank 14 having a trailer chassis or tandem 22.

As shown in FIG. 2, fifth wheel 20 has a conventional guide portion 21 with angularly arranged guide surfaces leading into a forwardly extending slot 28 and terminating in a semicircular abutment surface 32. King pin 24 of trailer 11 extends downwardly from base plate or wear plate 17 (secured to the bottom front surface of tank 14) and is engaged within surface 32. A lock mechanism to lock king pin 24 in place within abutment surface 32 is conventional and has not been shown.

Tractor 12 and trailer 11 are positioned to have the same general or common longitudinal axis 16. From this position, any relative pivotal movement between trailer 11 with respect to fifth wheel 20 is prevented during normal operation of refueler 10 by means for example, such as retractable king pins 26,27. Pins 26,27 are positioned to snugly engage the edges of fifth wheel 20 in a manner later to be described in detail. Accordingly, tractor 12 is effectively prevented from turning or pivoting sideways with respect to tractor 11. However, up and down or tilting between tractor and trailer is permitted by conventional pivot rod 29 which is secured to fifth wheel 20 and carried by a pair of supports 30,31 rigidly secured to chassis 25.

Another way for expressing this operation is to consider that tractor 12 and trailer 11 are positioned so that they lie along the same general longitudinal axis 16. With the vehicle disposed horizontally, a horizontal plane may be defined as passing through long axis 16 and a vertical plane may also be defined as passing through this axis. The detachable coupling including fifth wheel 20, king pin 24 and members 26,27 does not permit any relative motion between the tractor assembly and the trailer assembly in the horizontal plane but does permit relative motion in the vertical plane.

In this manner, the tractor-trailer combination operates as if it had an integral frame from chassis 25 through tank 14 to trailer chassis 22 except for the up and down pivotal movement allowed by pivot 29. Thus, the tractor and trailer operate substantially as a straight truck 10 where tractor axles 18 and 19 are both steerable and the vehicle pivots about tandem tractor axles 35a–b of tandem trailer chassis 22.

If there is a malfunction in refueler vehicle 10, such as for example, the engine of tractor 12 may need repair, then tractor 12 may be readily replaced. Trailer 11 continues to be operational and in service. Specifically, tractor 12 may be detached by lowering a conventional landing gear 38, members 26,27 are slidably retracted and the lock mechanism is disengaged. Lines are disconnected between trailer 11 and pumping module 15 in a manner later to be described and tractor 12 is moved forward from the then stationary trailer 11. In this manner, power module 12 and pumping module 15 are detached from the operable trailer 11 and a replacement may be backed into place to engage king pin 24. The lines between trailer 11 and module 15 are connected and landing gear 38 is retracted. If the tractor engine needs extensive repairs, then module 15 may be detached from the out of service tractor and used with an operational tractor.

On the other hand, the foregoing operation of detaching the tractor 12 and module 15 may be used if module 15 requires minor repairs and the tractor may be used to readily transport module 15 into a hanger where a fuel tank is not permitted by the airport authorities. Thus, for a module 15 malfunction, tractor 12 is available to transport it to the repair area while leaving trailer 11 operational and away from the repair area.

If repairs are required on module 15, it may be exchanged on tractor 12 by means of bolting and unbolting the module housing on chassis 25 and disconnecting and connecting the applicable lines and product pipe in a manner later to be described. In similar manner, if tank module 11 itself needs repair, the power module 12 and pumping module 15 may be detached for use with other operational tank modules.

Referring now to FIG. 2, there is shown in detail chassis 25 of tractor 12 supporting engine 41 and transmission 45. Engine 41 drives an air compressor 44 coupled by a line 46 to an air tank 48. An hydraulic pump 50 is driven from a power take off on transmission 45 and provides fluid under pressure by way of pressure line 52 to pumping module 15. Hydraulic fluid returning from module 15 is transmitted by way of return line 54 to a 100 gallon hydraulic fluid reservoir 56 which cools the hydraulic fluid and then by way of line 58 back to pump 50.

Transmission 45 is coupled through a drive shaft 60 to a differential 62 of second or tracking axle 19 which is both drivable and steerable. Axle 19 may, for example, be a Rockwell-Standard PS 157 front steering planetary axle while axle 18 may be a Rockwell-Standard FL 951. In this example, the distance between the centers of axles 18 and 19 may be about 150 inches where axle 18 has a turning limit of 40° and axle 19 has a turning limit of 28° so that the turning radius about trailer chassis 22 is approximately 57 feet.

Second axle 19 tracks front steering axle 18 in the following manner. A steering box 64 is coupled through a drag link 66 to left wheel 18a. Wheel 18a is coupled through a tie rod 68 to right wheel 18b and also through a bell crank 70, a tie rod 72 and a bell crank 74 to second axle tie rod 76. Conventional power steering cylinders 77a,b are coupled to right wheel 18b of first axle 18 and left wheel 19a of second axle 19 respectively.

Figure 5:
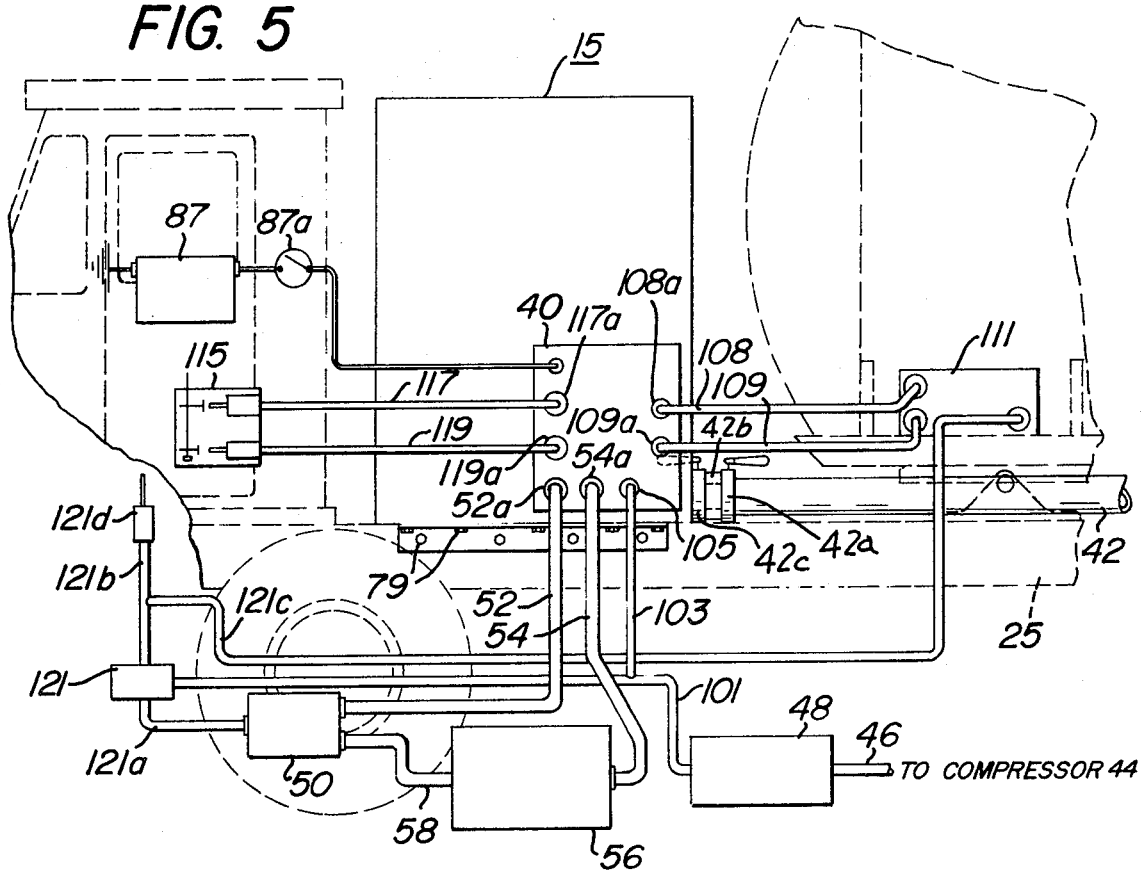
FIG. 5 shows in more detail a sectional view of the vehicle of FIG. 1 with portions of the hydraulic and pneumatic systems illustrated for purposes of clarity and not for exact positions on the vehicle.

As shown in FIGS. 3–5, module 15 is box shaped in the form of a rectangular solid having walls 78 and is removably secured to frame 25 as for example, by bolt fastener 79. As shown, all of the components which provide pumping, filtering, metering and modulating the flow of jet fuel are disposed within module 15 and therefore, if any one of these components malfunctions, then the entire module 15 may be easily removed from chassis 25 and a new pumping module put in its place.

The jet fuel is fluidly coupled to module 15 from tank 14 by way of a suction or discharge product line 42 which is controlled by a gate valve 42a. Since there is a substantial up and down movement between module 15 mounted on tractor 12 and tank 14, line 42 may be a flexible hose of 6 inch diameter of the type, for example, made by Goodall Rubber Manufacturing Co. of Trenton, N.J. and may have a length of about 70–80 inches. Hose 42 is supported along a major portion of its length by a support platform 75 secured to an upper surface of a right frame member of chassis 25. Platform 75 may be secured to chassis 25 as for example, by welding and may be made of sheet steel having supports on its lower surface. As shown, platform 75 extends outboard of chassis 25 toward the right side of tractor 12 and over right wheel 19c.

In order to provide for quick disconnection of product line 42 between modules 14 and 15, a victaulic coupler 42b is connected to valve 42a. The other side of coupler 42b is connected through a second gate valve 42c and through product line 42d which enters module 15 through a rear wall 78 thereof.

Within module 15, product line 42d is coupled to the input of a product or jet fuel pump 80 which is powered by hydraulic motor 82. As previously described, hydraulic pump 50 provides the hydraulic fluid flow for vehicle 10 and thus, hydraulic motor 82 which is within module 15 is actuated by means of fluid flow through lines 52b, 54b. Lines 52b, 54b are respectively coupled to the female portions of plug connectors 52a, 54a mounted on an interconnect panel 40 permanently secured to one sidewall 78 of module 15. To provide for the fluid flow, hydraulic pressure line 52 and return line 54 from tractor 12 are coupled respectively to the male quick disconnect portions of connectors 52a, 54a. In this manner, hydraulic motor 82 actuates pump 80 and the output of product pump 80 is coupled by way of conduit 84 to a filter 86. A bypass valve 85 is provided between 42d and conduit 84. The fuel under pressure flows out of filter 86 through a pressure control valve 88 and then through a valve 90 to a meter 92. From meter 92 the jet fuel flows through two lines 94, 95 and through respective wafer valves 96,97 into respective hose reels 98,99. Reels 98,99 are electrically operated rewind hose reels having the hoses 98a, 98b which are unwound by the operator for refueling an aircraft.

As previously described, air compressor 44 is coupled by line 46 to air tank 48. Air tank 48 is coupled by way of a line 101 to PTO selector 121 and line 103 to a quick disconnect plug connector 105 on panel 40. To begin the product pumping operation, a lever of selector 121 is actuated to apply air pressure on line 121a thereby to actuate pump 50 to its pumping state. In addition, selector 121 is effective to apply air pressure by way of lines 121b and line 121c to actuate tractor braking system unit 111 thereby to cause the brakes of tandem 22 to lock. Air pressure on line 121b is also effective by air clamp 121d to provide initial acceleration of engine 41 to operate hydraulic pump 50.

Connector 105 is coupled by way of a line 107 within module 15 to twin air hose 100 mounted on a spring rewind wheel of a dead man control assembly 102. In conventional manner, air hose 100 has a hand operated control valve (not shown) to provide for a dead man safety operation of pumping module 15.

The air under pressure in line 107 is also applied by means of separate lines in conjunction with hoses 98a, 98b as known in the art. Accordingly, when the respective nozzles of hoses 98a, 98b are removed from their cradle, an interlock activates causing air pressure to be applied through interlock lines in order to lock the brakes of tandem 22. Specifically, air under pressure is applied by way of connectors 108a, 109a and respective lines 108, 109 to braking system unit 111. In this manner, air pressure is applied through lines 108, 109 to provide a further means to assure locking of the trailer brakes.

The dead man control assembly 102 is effective to apply air pressure to the pilot valve of pressure control valve 88 and to air clamp assembly 115. Specifically, air clamp assembly 115 is coupled from panel 40 by way of connectors 117a, 119a and respective lines 117, 119 and is effective to speed up engine 41 when the dead man control assembly is actuated to indicate that fuel is being pumped.

A Venturi 97a is coupled between line 95 and valve 97 and is effective to control the pilot of pressure control valve 88 in order to vary the pressure in accordance with the back pressure in the aircraft tank. Further, filter 86 may have a cut off in the form of a water slug valve which is effective to deactuate pump 80 when water is detected in the system. Valve 90 is used in conjunction with an eductor 104 for defueling. Eductor 104 is coupled by way of line 106 directly to pipe 42d. Such dead man control assemblies, valves 85, 88, 90, filters 86, meter 92 and hose assemblies have been distributed by Wilco, Kenton, Ohio.

It will now be understood that if there is a malfunction in any one of the pumping, filtering, metering and modulating components of module 15 such as hydraulic motor 82 or product pump 80, vehicle 10 may be returned to operation by merely replacing module 15.

Figure 6:
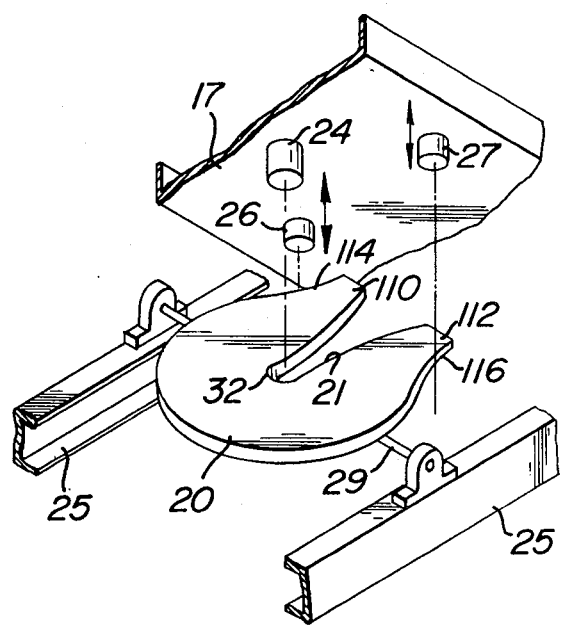
FIG. 6 is a perspective sectional view of the detachable coupling shown in FIGS. 1 and 2.

Referring to FIG. 6, there is shown in more detail, the underside of trailer 11 to which is secured in a base plate or wear plate 17. King pin 24 and rams 26,27 extend downwardly from plate 17. Each of the retractable king pins 26, 27 may be controlled to fold up or down with respect to plate 17 and may be of the type manufactured by Fruehauf Corporation, Omaha, Nebr. Alternatively, pins 26,27 may be slidably mounted with a respective cylinder which may be operated by air pressure under the control of an operator as set forth in detail in U.S. Pat. No. 2,959,429. Accordingly, when tractor 12 is to be uncoupled from trailer 11, pins 26,27 are retracted. Similarly, when a new tractor is backed into position, pins 26,27 are maintained in their retracted position until the replacement tractor is aligned with its long axis aligned with axis 16 and then pins 26,27 are extended so that they engage their respective side of fifth wheel 20. Specifically, pins 26,27 engage outer edges 114, 116 where guide portion 21 has guide legs 110, 112 each having a respective outer edge 114,116 with these edges being substantially parallel to long axis 16.

Pins 26,27 are positioned to provide a substantially snug fit so that there is substantially no sideways movement between tractor 12 and trailer 11 and between trailer 11 and fifth wheel 20.

Figure 7:
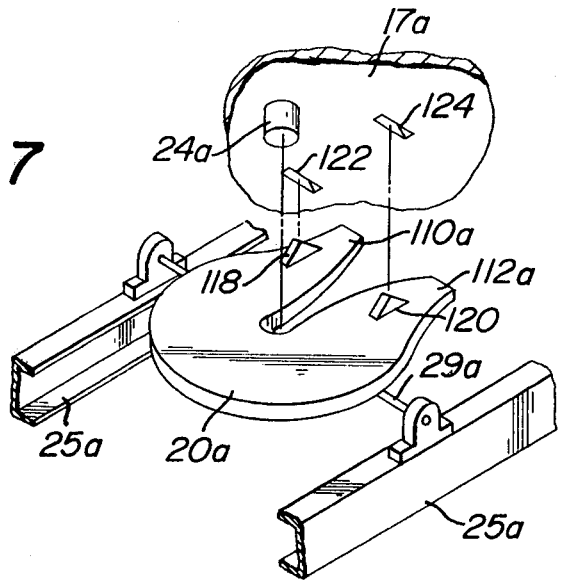

Another embodiment of the invention is shown in FIG. 7 in which fifth wheel 20a is provided with triangular shaped keys 118, 120 extending through guide legs 110a, 112a. Keys 118, 120 are adapted to engage corresponding triangular shaped openings 122, 124 in wearplate 17a. Keys 118, 120 may be the mechanically retracted keys of Coupler no. 3070-7-36 of Holland Hitch Company. In this manner, relative pivotal motion is prevented.

Figure 8:
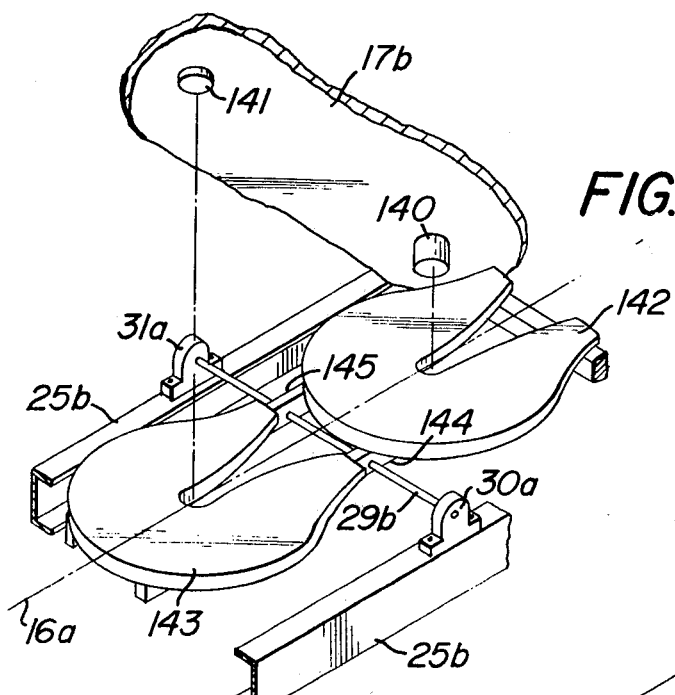

A further embodiment is shown in FIG. 8 in which instead of a single king pin and fifth wheel assembly, there is provided tandem king pins 140,141 for engaging tandem fifth wheels 142,143, respectively. Fifth wheels 142,143 are mounted one behind the other along long axis 16a at respective ends of a pair of beams 144,145 with the beams pivoting on pivot member 29b. With tractor 11 uncoupled, fifth wheels 142,143 are secured to beams 144,145 so that by gravity wheel 142 is in its lowermost position and wheel 143 is in its uppermost position. It will also be seen that pin 140 is somewhat longer than that of pin 141. Accordingly, when tractor 12 is backed into position with its long axis aligned with trailer 11, pin 141 passes over wheel 142 but does engage wheel 143 as this wheel is being pushed downwardly by wear plate 17b. As wheel 143 is being pushed downwardly, wheel 142 pivots upwardly to engage the longer pin 140. It will be understood that relative pivotal movement is prevented by the use of a pair of wheels 142, 143 which engage a respective pair of pins 140,141.

Figure 9:
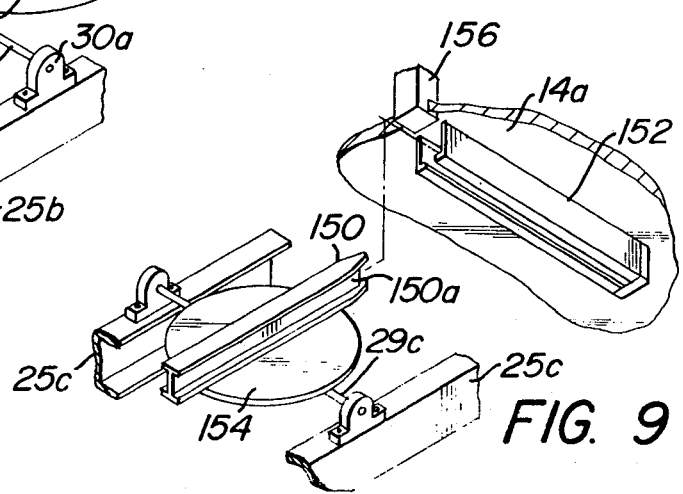

A still further embodiment is shown in FIG. 9 in which an "I" shaped insert 150 extends upwardly from tractor 12 is detachably coupled to a longitudinally extending sleeve 152 rigidly secured to plate 14a for preventing sideways movement between tractor-trailer. Insert 150 is secured at its bottom to a plate 154 pivotally mounted on pivot 29c. Insert 150 and plate 154 provide the function of a fifth wheel as in previous embodiments while sleeve 152 provides the detachable coupling of a king pin. It will be understood that for some applications, plate 154 may be directly attached to chassis 25c.

The upper elongated shoulder 150a of insert 150 is tapered at its rear end for ease in being received within sleeve 152 and the sleeve has a reduced lower dimension for capturing shoulder 150a. With insert 150 completely received within sleeve 152, insert 150 is prevented from being withdrawn by lowering a ram 156 which may be similar to rams 26,27 of FIG. 6.

As in FIG. 9, the embodiment of FIG. 11 shows a detachable coupling without the use of a fifth wheel. Specifically, a partial subframe 160 is welded to the underside of tank 14 with a pair of downwardly extending mounting blocks 162,163 welded to subframe 160. As shown, block 163 is adapted to be engaged between a pair of upwardly extending mounting ears or blocks 164,165 rigidly secured to the left side of chassis 25d while block 162 is received between a pair of upwardly extending blocks 168,169 secured to the right side of chassis 25d. A transverse opening in block 163 is in register with transverse openings in blocks 164,165 for receiving a pin 170. Similarly, a transverse opening in block 162 cooperates with transverse openings in blocks 168,169 for receiving a pin 172. In this manner, tractor and trailer are placed in position with the transverse openings in register and pins 170, 172 are inserted to provide the detachable coupling and to prevent the relative motion.

A still further embodiment is shown in FIG. 10 in which king pin 24b engages fifth wheel 20b and in which fifth wheel 20b is pivotally mounted to supports 30b,31b. Mounting posts 174,175 are secured to opposing sides of wear-plate 17c each having longitudinal openings which are in register with threaded openings in mounts 30b,31b when the tractor and trailer are in the coupling position. Accordingly, bolts 176,177 are received within openings in 174,175 and are threadedly engaged within blocks 30b,30b respectively.

The embodiment shown in FIG. 12 has a partial subframe 180 secured to the underside of tank 14 as in FIG. 11. Extending downwardly from subframe 180 are a pair of "U" shaped members 182,183 which form pockets for receiving respective members 184,185 which extend from left and right sides of chassis 25f of tractor 12. In this manner, relative motion is prevented while there is provided the conventional connection between tractor and trailer by way of the king pin 24c and fifth wheel 20.

A further additional embodiment is shown in FIG. 13 in which fifth wheels 190,191 secured to pivot rod 29d. Pivot rod 29d defines an axis transverse to the longitudinal axis and fifth wheels 190,191 are mounted side by side on such transverse axis. These fifth wheels engage respective king pins 192,194 extending from wearplate 17e. Accordingly, by the use of these tandem king pin and fifth wheel combination relative pivotal motion is prevented between tractor and trailer in a horizontal plane passing through the longitudinal axis. Tank 14 may be bottom loaded with jet fuel in conventional manner by means of hose 123 and valve 123a.

In further embodiments, it will be understood that module 15 may be carried by trailer 11 instead of by tractor 12. For example, trailer 11 may have a forwardly extending frame to support module 15 or module 15 may be mounted on the underside of tank 14 approximately between the ends thereof.

It will be understood that after vehicle 10 has completed service as a module airport refueler for jet aircrafts, it may be sold in the used conventional tractor-trailer market. Without modification, trailer 11 may be sold as an over the highway fuel trailer. With module 15 removed, chassis 25 may be shortened to form a conventional tractor 12 and axle 19 may be prevented from steering or a new axle substituted. Tractor 12 may then be sold as a used tractor.

What is claimed is:
1. A fuel transport land vehicle comprising
   a tractor,
   a fifth wheel assembly including means mounting said fifth wheel means to said tractor,
   a trailer for carrying jet fuel for engaging said fifth wheel assembly,
   means during normal operation of said vehicle for solely preventing any relative pivotal movement between said trailer with respect to said fifth wheel assembly thereby preventing sideways pivoting between trailer and tractor but allowing said tractor to be easily removed from said trailer for maintenance and repair, said fifth wheel assembly mounting means including pivoting means for providing normal up and down movement between tractor and trailer during normal operation of said vehicle, and
   said trailer having a tank for carrying said jet fuel and pumping module means including a housing having disposed therein means for filtering said jet fuel and means for modulating the flow of said jet fuel from said tank.

2. The fuel transport land vehicle of claim 1 in which said tractor has a plurality of axle and said trailer has at least one axel, and means for steering all of said tractor axles which define all the front axels of said vehicle whereby said vehicle pivots only about said trailer axle.

3. The fuel transport land vehicle of claim 1 in which said pivotal movement preventing means includes retractable members movable between (1) a first position for engaging opposing sides of said fifth wheel assembly to prevent said relative pivotal movement and (2) a second position for disengaging said fifth wheel assembly.

4. The fuel transport land vehicle of claim 3 in which said pivotal movement preventing means includes retractable means extending from a retracted position to an upper position from said fifth wheel assembly, said trailer having means for engaging said retractable means thereby to prevent said relative pivotal motion when said retractable means is in said extended position.

5. The fuel transport land vehicle of claim 4 in which said retractable means includes a plurality of keys and said engaging means includes a plurality of slots cooperating with said keys.

6. The fuel transport land vehicle of claim 1 in which said fifth wheel assembly comprises a pair of fifth wheels, said trailer having a cooperating pair of king pins for respectively engaging said pair of fifth wheels thereby to prevent said relative pivotal motion.

7. The fuel transport land vehicle of claim 1 in which said housing comprises a single housing, and said filtering means and said modulating means are all disposed within said single housing, and means for detachably securing said housing to said tractor platform.

* * * * *